COATING OR PLASTIC.

Patented Jan. 7, 1941

2,227,790

UNITED STATES PATENT OFFICE 2,227,790

CEMENT OR PLASTER

Henry H. Moreton, Santa Monica, Calif.

No Drawing. Application May 6, 1935,
Serial No. 20,096

4 Claims. (Cl. 106—24)

This invention is a silica cement or plaster, particularly adapted for building purposes where the use of plaster or cement is indicated, the invention also including the process of making the cement or plaster.

One of the objects of the invention is to provide a cement possessing an extraordinary degree of fineness, and which will have the characteristics of coating the aggregate with which it may be associated, to a far greater degree than is possible with ordinary Portland and similar cements. A further object is to provide a cement or plaster characterized by less volumetric shrinkage, and greater sound absorbing qualities than ordinary cements and plasters now in general use. Another object of the invention is to provide a cement of the character mentioned possessing great initial plasticity, thereby permitting of better workability. Another object is to provide a plaster coating or cement which is particularly well adapted for use on wood lath, wire mesh, brick, concrete, tile, and gypsum block surfaces without shrinkage. A further object is to provide a plaster or cement for acoustic purposes which may be diluted with sand, pumice, pumicite, diatomaceous earth, or other light aggregates to a greater degree than is possible with cements and plasters now in general use.

The invention will be hereinafter fully set forth and particularly pointed out in the claims.

Broadly speaking, the invention consists of a mixture of hydraulic or similar cement, lime, silica, and an inorganic plasticizer.

There has recently been discovered in the Mohave Desert regions of California a colloidal hydrous magnesium silicate which has not heretofore been identified in any authoritative publication. It is distinguishable from other previously known hydrous magnesium silicates such as talc and meerschaum, by reason of its exceedingly high absorptive characteristics which causes it to form a gel in the presence of water. It is further distinguished from said other magnesium silicates by reason of its very low alumina content. For this reason it has been termed "Colloidal" so as to distinguish from other hydrous magnesium silicates. No better method of identification of this material is known than the following representative analysis:

| | |
|---|---|
| Silica | 28.92 |
| Alumina | .82 |
| Calcium oxide | 21.50 |
| Ferric oxide | .08 |
| Magnesia | 14.07 |
| Soda | 2.34 |
| Loss on ignition | 32.27 |
| Absorption per cent | 75 |

Loss on ignition represents undetermined organic matter. The above material is a natural silicate product of high absorption characteristics, and in this particular differs very materially from other complex silicates containing magnesia and alumina. It is a plasticizer of remarkable characteristics, and it will be noted that its inherent alumina content is so low that the quantities of any aluminates or of any alumina-silicates which may be formed within the mixture will be negligible. The above analysis is typical and wherever proportions are given in the specification and claims, it is to be understood that they are approximately only, because obviously said proportions are likely to vary with different samples. In other words, the analysis is given as a typical example to identify as closely as possible the natural silicate product found in the Mohave Desert region of California, possessing the above identified characteristics, and particularly an inherent alumina content so low that its influence within the mixture is practically negligible.

In practice, it is preferred to place a mixture of Portland cement, ground silica or silica sand which has been previously washed, and hydraulic lime in a ball mill or other suitable form of grinder or mixer, and to mix and/or grind said materials together, depending upon which type of apparatus is employed. During the mixing a small percentage of colloidal hydrous magnesium silicate is added.

The function of the plasticizer is to mix with the water used when the cement or plaster is being prepared for use, and to cause the water to entrap any gases which may be released during the mixing operation, thus producing a material of a more or less fluffy character possessing great sound absorbing characteristics. During such mixing any free lime which may be liberated will combine chemically with the silica, which should be ground exceedingly fine to produce best results.

The proportions of the different ingredients may be varied to suit different conditions, but excellent results have been obtained with a mixture of about the following proportions by bulk:

| | Per cent |
|---|---|
| Portland cement | 40 |
| Hydraulic lime | 20 |
| Ground silica (preferably pre-washed) | 35 |
| Colloidal hydrous magnesium silicate | 5 |

The mixture produced by the ingredients hereinabove described, either in the relative proportions of the above formulae or in any desired variations thereof, after grinding, provides a cement or plaster of extreme fineness and smoothness, which may be used for mortar, stucco, plaster and for other general cement and plaster construction either with or without mixture with an aggregate. An excellent substantially soundproof wall plaster is obtained by mixing the cement with a light weight aggregate such as pumice (⅛" mesh) pumicite, diatomaceous earth, aerated calcined clay, and the like. However, satisfactory results are also obtainable by combining the mixture with any of the well known ordinary aggregates.

It is to be understood that although Portland cement has been specifically mentioned above as one of the ingredients of the mixture, the invention is not limited to this particular cement, because any other well known cement of the same class, such as Tufa cement, and/or natural cement may be substituted for the Portland cement without departing from the spirit of the invention. Therefore, wherever the term "Portland cement" is used in the specification and claims, it is the intent to not only include this particular cement but also to include any equivalent cement such as those above mentioned. It is to be also understood that the invention is not limited to hydraulic lime specifically, but is intended to include obvious modifications such as Feeble Lime, Eminently hydraulic lime and/or hydrated lime. Therefore, wherever the term "hydraulic lime" is employed in the specification and claims, it is not to be construed as limiting the invention but as also including other equivalent materials such as those above listed.

Having thus explained the nature of the invention and described an operative manner of constructing and using the same, although without attempting to set forth all of the forms in which it may be made, or all of the forms of its use, what is claimed is:

1. A cement consisting of a mixture of Portland cement, ground silica, hydraulic lime and a natural silicate product native to the Mohave Desert region of California, said product being a gel-forming colloidal material containing approximately 14.07% of magnesia and characterized by a high water absorptiveness, and an inherent alumina content of approximately .82%, said alumina content being so low that the quantities of any aluminates or alumina-silicates which may be formed within the mixture will be negligible.

2. A colloidal cement consisting of a ground mixture of Portland cement, ground silica, hydraulic lime, and a natural silicate product native to the Mohave Desert region of California, said product being a gel-forming colloidal material containing approximately 14.07% of magnesia and characterized by a high water absorptiveness, and an inherent alumina content of approximately .82%, said alumina content being so low that the quantities of any aluminates or alumina-silicates which may be formed within the mixture will be negligible.

3. A colloidal cement consisting of a ground mixture of approximately 40% of Portland cement, approximately 35% of ground silica, approximately 20% of hydraulic lime, and approximately 5% of a natural silicate product native to the Mohave Desert region of California, said product being a gel-forming colloidal material containing approximately 14.07% of magnesia and characterized by a high water absorptiveness, and an inherent alumina content of approximately .82%, said alumina content being so low that the quantities of any aluminates or alumina-silicates which may be formed within the mixture will be negligible.

4. The method of manufacturing cement comprising grinding together a mixture of Portland cement, sand and hydraulic lime, and during the grinding thereof adding to the mixture a natural silicate product native to the Mohave Desert region of California, said product being a gel-forming colloidal material containing approximately 14.07% of magnesia and characterized by a high water absorptiveness, and an inherent alumina content of approximately .82%, said alumina content being so low that the quantities of any aluminates or alumina-silicates which may be formed within the mixture will be negligible.

HENRY H. MORETON.